INVENTOR:
J. L. Whisenhunt
By Smyth, Roston & Pavitt
Attorneys.

INVENTOR:
J. L. Whisenhunt
By Smyth, Roston & Pavitt
Attorneys.

United States Patent Office 3,065,424
Patented Nov. 20, 1962

3,065,424

RADIO RECEIVER WITH MEANS FOR COMPENSATING FOR VARIATIONS IN THE SUPPLY VOLTAGE

J. L. Whisenhunt, Reseda, Calif., assignor to Packard-Bell Electronics Corporation, Los Angeles, Calif., a corporation of California Filed Dec. 20, 1960, Ser. No. 77,187
16 Claims. (Cl. 325—319)

This invention relates to radio receivers and, more particularly, to portable or battery operated radio receivers.

One of the more important considerations in portable radio receivers is the conservation of the battery. The utility of the receiver relates to the life of the batteries utilized for energizing the receiver. Further, the fidelity of the produced sounds with respect to the received signals is effected in conventional receivers by variations of the battery supply. For example, as the battery becomes weaker, the bias provided in the output circuit driving the speaker reduces and causes objectionable distortions of the audio signal.

Considering the output circuit, additional disadvantages of conventional receivers is that variations in the characteristics of the components utilized in the output circuit affect the performance of the receiver. In one popular output circuit, a pair of junction transistors are operated in push-pull class B amplifier operation. The characteristics of the transistors vary with temperature and, accordingly, vary the performance of the receiver.

One suggestion for compensating for both supply voltage variations and for ambient temperature variations utilizes a compensation diode serially connected with a bleeder resistor between the battery and the chassis ground. The bias potentials are taken from the junction of the diode and a bleeder resistor. The potential across the diode decreases substantially linearly with increase of temperature, and the current through the diode decreases substantially linearly with decreases of potential across the diode. Though the compensating diode provides for a regulation, the additional current required for its operation due to the shunting circuit through the bleeder resistor provides an additional current drain and tends to materially reduce the life of the battery.

In a specific illustrative embodiment of this invention, a transistor radio receiver is provided which includes regulating means to compensate for supply voltage variations and ambient temperature variations without reducing the battery life. In fact, the utilization of the regulating means of this invention increases the life of the battery. In the specific illustrative embodiment, a regulating diode is provided for the compensation but the bleeder resistor and the shunting connection through the bleeder resistor are not required for the diode. Instead of the bleeder resistor, a number of stages of the receiver are utilized as part of the bias arrangement. The various stages, which may include a radio frequency amplifier stage, an autodyne oscillator stage, an intermediate amplifier stage, and an audio amplifier stage, etc., are connected between the receiver battery and a floating ground or common connection instead of between the battery and the chassis ground. The regulator diode is coupled between the floating and the chassis grounds so that the various stages of the receiver are serially connected with the regulated diode between the battery and the chassis ground.

Each of the stages of the receiver, in this manner, has a dual function in that it also serves as part of the regulator biasing arrangement including the regulated diode for the power amplifier stage of the receiver. The direct current drawn by the various stages is adjusted to supply a predetermined forward direct current for the compensation diode to provide for the desired regulated voltage across the diode.

Features of this invention relate to the provision of means for reducing the current from the battery for strong input signals such as from local stations. The receiver includes an automatic gain control which functions to reduce the forward direct current through the compensation diode for strong signals by adjusting the impedance presented by the stages to which the automatic gain control is applied. The current drawn from the battery and through the compensation diode is, accordingly, reduced for strong signals.

Various other advantages and features of this invention will become apparent upon consideration of the following description when read in conjunction with the drawing wherein.

Figure 1:
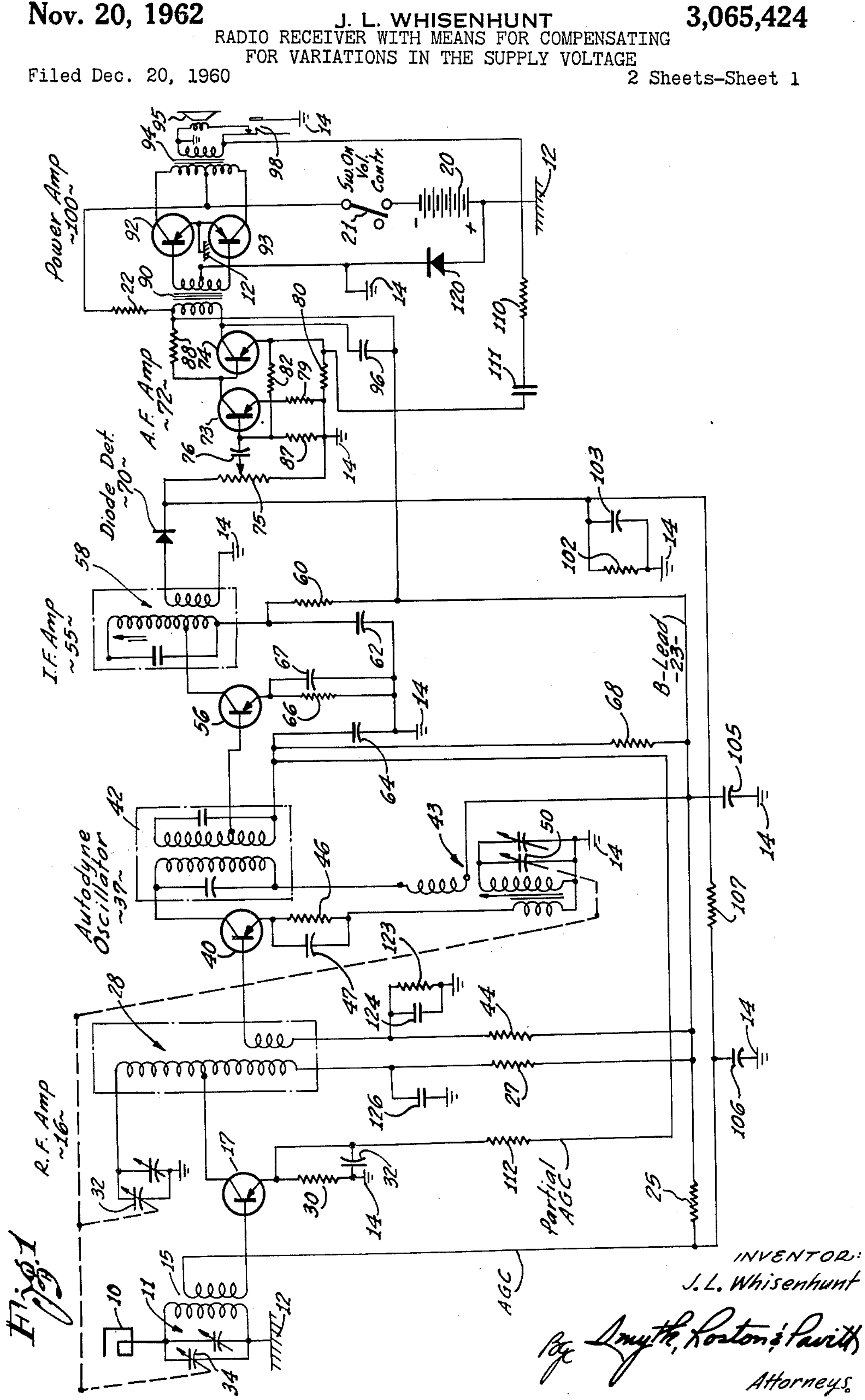
FIGURE 1 is a circuit representation of the battery operated radio receiver of this invention.

Referring first to FIGURE 1, the radio receiver depicted therein may be generally of the autodyne receiver type utilized for the conventional broadcast band. The various modulated carriers are received at an antenna 10 which is coupled by an adjustable tuned circuit 11 to the chassis ground 12. As is hereinafter described, the radio receiver includes a chassis ground 12 and also a floating ground 14. Each of the symbols for the grounds 12 and 14 have been respectively similarly designated in FIGURE 1. The tuned circuit 11 includes a variable capacitor 34 shunted by a trimmer capacitor, and the primary winding of a transformer 15.

The circuit 11 is coupled by the transformer 15 to a radio-frequency amplifier 16 which includes a P-N-P junction transistor 17 as its active element. The transistor 17, illustratively, of the type designated 2N544, is biased from a battery 20 through an on-off switch 21, a resistor 22 to a B— lead 23. The battery 20 may provide a potential of approximately 6 volts, and the lead 23 is connected by a resistor 25 and the secondary of the transformer 15 to the base electrode of the transistor 17. The lead 23 is also connected by a resistor 27 and a portion of the primary winding of a transformer 28, which forms part of the amplifier 16, to the collector electrode of the P-N-P transistor 17. The emitter electrode of the transistor 17 is connected to the floating ground 14 by a resistor 30 which is shunted by a capacitor 32. The junction between the resistor 27 and the primary winding is coupled to ground by a capacitor 126.

The amplifier 16 is tuned by means of an adjustable capacitor 32 which is ganged to an adjustable capacitor 34 in the tuned circuit 11. The capacitor 32 is shunted by a trimmer capacitor and coupled to the upper end of the primary winding of the transformer 28. The amplifier 16 operates in a conventional manner to amplify the modulated carrier to which the tuned circuit 11 and the amplifier 16 are set. The transformer 28 couples the amplified signal to an autodyne oscillator 37 which includes a P-N-P junction transistor 40 as its active element. The transistor 40 may be of the type designated 2N374. The collector electrode of the transistor 37 is connected to the B— lead 23 through the primary winding of a transformer 42, and the primary winding of a transformer 43. The two transformers 42 and 43 may actually form part of one composite transformer arrangement. The base electrode of the transistor 40, to which the amplified signals from the amplifier 16 are provided, is connected to the lead 23 through the secondary of the transformer 28 and a resistor 44. The junction of the resistor 44 and the secondary winding is connected by a resistor 123 and by a capacitor 124 to ground 14. The emitter electrode of the transistor 40 is connected to the floating ground 14 through a resistor 46 shunted by a capacitor 47 and a portion of the secondary winding of the transformer 43.

The feedback signal for promoting the regeneration is provided through the transformer 43 from the collector electrode of the transistor 40 back to its emitter electrode. The oscillating frequency is determined by the setting of a capacitor 50 which is ganged to the capacitors 32 and 34 described above. A conventional type trimmer capacitor is also provided for the capacitor 50. The oscillator frequency is heterodyned with the carrier frequency to develop a difference or intermediate frequency signal which is coupled through the transformer 42. The intermediate frequency may be 455 kilocycles. Both the primary and the secondary windings of the transformer 42 are shunted by a capacitor and the output is taken from a tap of the secondary winding to provide for an impedance match between the autodyne oscillator 37 and an IF amplifier stage 55. The secondary winding of the transformer 42 is also connected to the floating ground 14 by a capacitor 64.

The IF amplifier stage 55 includes a PNP junction transistor 56 as its active element, and a transformer 58 having a tuned primary coupled to the collector electrode of the transistor 56. The transistor 56 may be of the type designated 2N373. The collector electrode of the transistor 56 is connected to the B— lead 23 through a portion of the primary winding of the transformer 58 and a resistor 60. The primary winding is also connected to the floating ground 14 by a capacitor 62. The emitter electrode of the transistor 56 is connected to the floating ground 14 by a resistor 66 which is shunted by a capacitor 67.

The amplified intermediate frequency signal is introduced to a diode detector 70 which demodulates the signal to recover the audio frequency signal. The audio frequency signal is introduced to an audio amplifier 72 which includes two current control members such as PNP junction transistors 73 and 74, illustratively of the type designated 2N408. The audio signals are provided to a first control element of one of the current control members such as the base electrode of the transistor 73 through a potentiometer 75 and a capacitor 76. The potentiometer 75 functions as a manual volume control in the radio receiver. One terminal of the potentiometer 75 is connected to the floating ground 14 and its other terminal is connected to the detector 70.

Second control elements of the current control members such as the emitter electrodes of the transistors 73 and 74 are connected respectively to ground by resistors 79 and 80. Negative feedback is provided from the emitter electrode of the transistor 74 through a resistor 82 back to the base electrode of the transistor 73. The base electrode of the transistor 73 is connected to the floating ground 14 by means of a resistor 87. The signal amplified by the transistor 73 is introduced from its collector electrode directly to the base electrode of the transistor 74 and also through a resistor 88 to one side of the primary winding of a transformer 90 which connects to lead 23. B— potential is applied from the battery 20 through the switch 21, the resistor 22 and a resistor 88 to the collector electrode of the transistor 73. The potential is also supplied through the primary winding of the transformer 90 to the collector electrode of the transistor 74. The primary winding of the transformer 90 is shunted by a capacitor 76.

The amplified signals from the two-stage amplifier 72 are coupled through the transformer 90 to a push-pull, class B, power amplifier 100 including two transistors 92 and 93, illustratively of the type designated 2N408. The base electrodes of the transistors 92 and 93 are connected to the opposite terminals of the secondary of the transformer 90. The center tap of the secondary of the transformer 90 is connected to the floating ground 14. The emitter of the transistor 92 and the collector of the transistor 93 are connected in common and to the chassis ground 12. The collector electrodes are connected to the opposite terminals to the primary winding of an output transformer 94. B— potential is provided to the center tap of the primary winding of the transformer 94 for biasing the collector electrodes of the transistors 92 and 93.

The output transformer 94 is coupled to a speaker 95 and to a jack 98 serially connected therewith. The jack 98 may be utilized for providing the amplified audio signals to another utilization device, not shown. The upper terminal of the secondary winding of the transformer 94 is connected to the floating ground 14. The amplified audio signals from the secondary winding of the transformer 94 are fed back through a serially connected resistor 110 and capacitor 111 to the emitter electrode of the transistor 74 in the amplifier 72. This negative feedback and the negative feedback in the amplifier 72 both provide for improved fidelity.

The two grounds 12 and 14 in the receiver are interconnected by a compensation diode 120 having its anode connected to the positive terminal of the battery 20 and its cathode connected to the floating ground 14. The diode 120 may be a germanium alloy diode of the type designated 1N2326 manufactured by the Radio Corporation of America. The diode 120 has characteristics substantially similar to the two junction transistors 92 and 93 which may also be germanium alloy types and, illustratively, as indicated above, of the type designated 2N408 manufactured by the Radio Corporation of America. The diode 120 compensates for effects of temperature and battery voltage changes in the operation of the push-pull audio frequency amplifier 100.

Figure 2:
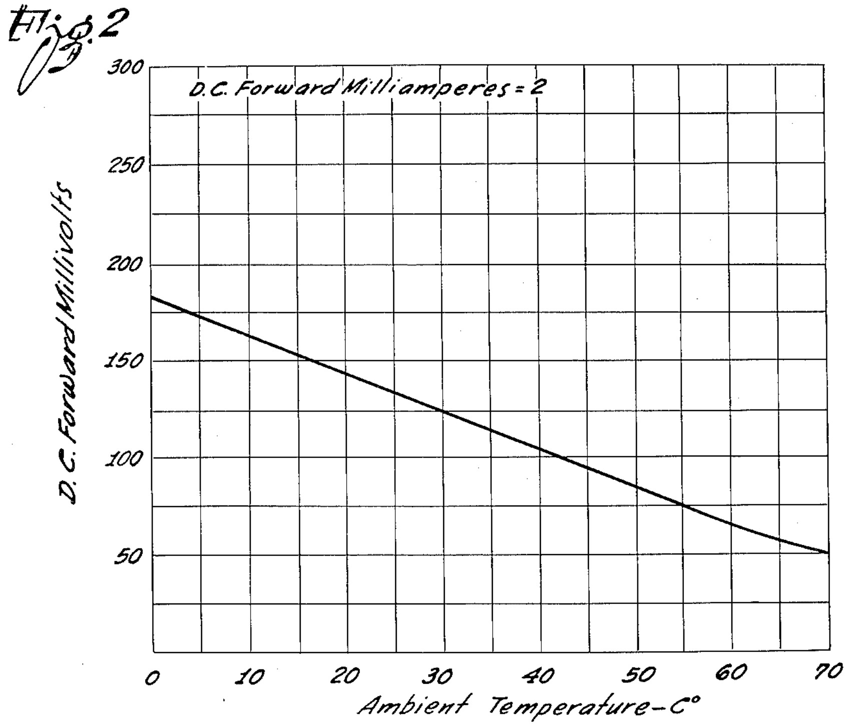
FIGURE 2 is a curve illustrating the voltage versus temperature characteristic of the compensation diode utilized in the receiver of this invention.
Figure 3:
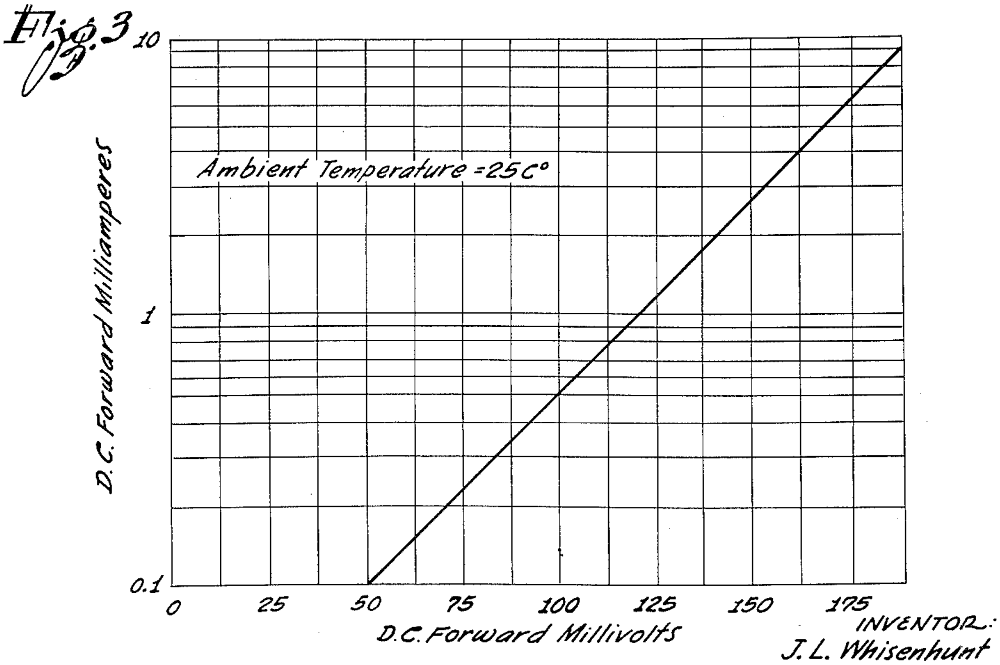
FIGURE 3 is a curve illustrating the current versus voltage characteristic of the compensation diode utilized in the receiver of this invention.

FIGURES 2 and 3 illustrate typical characteristics for the diode 120 with FIGURE 2 illustrating the D.C. forward potential across the diode 120 for different temperatures and with FIGURE 3 illustrating the current through the diode for different potentials across it.

Assume, for example, that the ambient temperature increases so that the D.C. amplification factor Beta (HFE) of the two transistors 92 and 93 increases. The increase of the amplification factors (HFE) of the transistors 92 and 93 tends to increase the gain of the amplifier 100 introducing corresponding distortion and the thermal runaway. The thermal runaway is more controlling than the A.C. gain which is identified as "hfe." The D.C. gain is identified as "HFE." As the temperature, however, is increased, the biasing potential applied at the base electrodes of the transistors 92 and 93 decreases due to the characteristic of the diode 120 and prevents thermal runaway. FIGURE 2 illustrates that as the temperature increases, the D.C. forward potential also decreases. The potential at the floating ground 14, accordingly, is decreased by the compensating effect of the diode 120 to decrease the D.C. gain (HFE) through the amplifier 100.

FIGURE 3 illustrates that as the potential provided by the battery 20 may decrease up to 40 percent due to aging or other factors, the current through the diode 120 decreases only 10 percent so that the biasing potential between the two grounds 12 and 14 is somewhat regulated. The small decrease in the biasing potential across the diode 120 functions to regulate the D.C. gain (HFE) through the amplifier 100. In this manner, the diode 120 maintains the bias voltage applied to the amplifier 100 relatively constant with supply voltage variations while simultaneously compensating for ambient temperature variations.

The current provided through the diode 120 from the chassis ground to the floating ground 14 is provided in parallel through the various stages of the receiver. In fact, the battery 20 is shunted by a series arrangement including the diode 120 and the paralleled stages of the receiver. To illustrate this connection, the diode 120 is connected to the floating ground 14 and, at the amplifier 16, the floating ground 14 is connected through the resistor 30, the emitter-to-collector path of the transistor 17, the lower portion of the primary winding of the transformer 28, the resistor 27, through the B— lead 23, the resistor 22 and through the switch 21 to the negative terminal of the battery 20. The amplifier stage 16 is accordingly, serially connected with the diode 120 across the battery 20. Similarly, the other stages are connected in series with the diode 120 across the battery 20. These stages, in this manner, function together as a bleeder resistor for the compensating diode 120.

To provide for an adequate compensation, the cumulative direct current impedance of the stages in parallel is designed to provide for a predetermined current through the diode 120. Illustratively, the cumulative or composite impedance may be 1500 ohms and the current through the diode 120 may be 4 milliamperes. By utilizing the stages 16, 37, 55 and 72, to serve as the bleeder resistor for the compensating diode 120, a separate shunting path through a bleeder resistor is not required. By avoiding the utilization of a bleeder resistor and separate shunting path therethrough, the amount of current required from the battery 20 is materially reduced. Illustratively, a savings of approximately 25 percent of current is achieved with a corresponding increase in battery life.

The compensation in the output amplifier 100 is achieved by varying the emitter-to-base bias of the two transistors 92 and 93. As described above, the emitter electrodes of the transistors 92 and 93 are connected to the chassis ground at one side of the battery 20. The base electrodes, however, are connected to the floating ground 14 and the diode 120. As the potential across the diode 120 varies, the bias potentials across the emitter-to-base junctions of the transistors 92 and 93 are, accordingly varied therewith.

In addition to these advantages, the current from the battery 20 through the diode 120 is reduced for strong input carrier signals such as from local or close stations. The receiver includes an automatic gain control arrangement having a resistor 102 shunted by a capacitor 103 coupled between the diode detector 70 and the floating ground 14. The capacitor 103 removes the radio frequency components of the potential at the cathode of the detector 70 so that the signal appearing across the capacitor 103 relates to the level of the demodulated signal provided through the detector 70. This signal is provided through a resistor 107 which is connected to a capacitor 106 having one terminal connected to the floating ground 14. The capacitor 106 removes the audio frequency components. The signal across the capacitor 106 is introduced to the base electrode of the transistor 17 to adjust the gain of the amplifier 16 in a reverse manner with respect to the level of the audio signals from the diode detector 70.

A partial automatic gain control is also provided for the amplifier 55 due to a connection from the emitter electrode of the transistor 17 through a resistor 112 and a portion of the secondary winding of the transformer 42 to the base electrode of the transistor 56 in the amplifier 55. The gain of the intermediate frequency amplifier 55 is, accordingly, controlled together with the gain of the radio frequency amplifier 16. As the level of the signal increases, a larger or more positive signal is applied to the base electrodes of the transistors 17 and 56 reducing the gain through these transistors and effectively increasing the impedance presented by these stages in series with the diode 120.

As described above, the diode 120 is serially connected with each of the amplifiers 16 and 55 across the battery 120. If the impedance presented by the amplifiers 16 and 55 is increased due to the operation of the automatic gain control, the current through the diode 120 reduces. In this manner, the battery 20 provides smaller amounts of compensation current when strong signals are received due to the operation of the automatic gain control.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A radio receiver for receiving a modulated carrier and having a chassis, including, a common connection connected to the chassis; a source of direct voltage and having a first terminal connected to said common connection and having a second terminal; a first amplifier for said modulated carrier and connected to receive a voltage from the second terminal of the voltage source; means coupled to said first amplifier for obtaining a demodulation of said modulated carrier from said first amplifier to recover the modulating signals; a second amplifier coupled to the demodulating means for amplifying the demodulated signals; means coupling the voltage from the second terminal of the voltage source to the second amplifier for energizing the second amplifier; a floating ground; compensating means connected between the common connection and the floating ground and having a variable impedance to provide compensations in the operation of the radio receiver for changes in the temperature of the receiver and in the direct voltage from the source, and the first and second amplifiers being connected to the floating ground to provide shunting impedances for the compensating means for facilitating the compensating actions of the compensating means.

2. The receiver set forth in claim 1 in which the compensating means is a unidirectional member.

3. In a radio receiver for modulated signals and having a chassis, a chassis ground connection connected to the chassis of the receiver; a source of direct voltage for energizing the receiver and having a first terminal connected to said chassis ground connection and having a second terminal; a floating ground connection; an output amplifier stage having a first portion connected between said second terminal of said voltage source and said chassis ground connection and having a second portion connected between said chassis ground connection and said floating ground connection to control the amplification of said stage in accordance with differences in potential between the chassis ground and the floating ground; means connected between said chassis ground connection and said floating ground connection and having an impedance variable with variations in the potential from the source for regulating the potential applied across said output amplifier stage by said voltage source and for regulating the potential at said floating ground; means for amplifying the modulated signals received at the receiver; means coupled between said amplifier means and said amplifier stage for demodulating the modulated signals and for supplying the modulating components thereof to said output amplifier stage; and circuit means connecting said amplifier means between said second terminal of said voltage source and said floating ground connection whereby said amplifier means functions as a bleeder resistor for said variable impedance means to control the potential at said floating ground.

4. The receiver set forth in claim 3 in which the variable impedance means is a diode.

5. A portable radio receiver for receiving a modulated signal and having a chassis, including, a source of direct voltage, a chassis ground connected to the chassis of the receiver, a floating ground, the source of direct voltage being provided with first and second terminals and the first terminal of the voltage source being connected to the chassis ground, an output amplifier energized by said voltage source from the second terminal of the voltage source and connected to receive the chassis ground and the floating ground for control over the operation of the amplifier in accordance with any difference between the chassis ground and the floating ground, means including an impedance element connected to the chassis ground and the floating ground and having characteristics for controlling the potential applied by said voltage source to said output amplifier, and means connected in a circuit with said impedance element for further controlling the potential applied by said voltage source to said output amplifier, said last named means including means for demodulating the modulated signal.

6. A portable receiver for receiving a modulated signal in accordance with claim 5, wherein, said output amplifier includes a pair of transistors connected in a push-pull arrangement and having first control terminals connected to the chassis ground and having second control terminals connected to receive the floating ground, and wherein said impedance element is a semiconductor diode.

7. A radio receiver for receiivng and demodulating a modulated carrier and having a chassis, including, a source of direct voltage and having first and second terminals, a ground connection to the chassis, a floating ground, a first amplifier for the modulated carrier and connected to receive potential from said first terminal of said voltage source and connected to receive the floating ground, a direct current biasing path for said amplifier and including a member connected to said second terminal of said battery and to said floating ground and having an impedance variable with the potential introduced to the member from the voltage source to produce variations in the potential at the floating ground, means coupled to said amplifier for demodulating the amplified modulated carrier from said amplifier, an output amplifier coupled to the demodulating means for amplifying the demodulated signal from said demodulating means, said output amplifier including two current control members in a push-pull arrangement, each of said current control members having a pair of control elements respectively connected to receive the chassis ground and the floating ground and having a third element connected to receive potential from the first terminal of the voltage source for the production of an output signal by said output amplifier in accordance with the relative characteristics of the potentials at the chassis and reference grounds and in accordance with the operating parameters of the variable impedance member, and means connecting said output amplifier to said variable impedance member and to said first terminal of said voltage source.

8. A radio receiver for receiving and demodulating a modulated carrier and having a chassis, including, a source of direct voltage and having first and second terminals, a ground connection to the chassis, a floating ground, an amplifier for the modulated carrier and connected to receive potential from said first terminal of said voltage source and connected to the floating ground, a direct current biasing path for said amplifier and including a diode connected to said floating ground and said chassis ground to vary the potential of said floating ground in accordance with changes in the ambient temperature in the receiver and changes in the voltage from the source, means coupled to said amplifier for demodulating the amplified modulated carrier from said amplifier, and an output amplifier coupled to the demodulating means and responsive to the difference between the chassis and floating grounds for amplifying the demodulated signal from said demodulating means in accordance with the difference between the chassis and floating grounds.

9. A radio receiver for receiving a modulated carrier and having a chassis, including, a common connection to the chassis; a floating ground; a source of direct voltage and having a first terminal connected to said common connection and having a second terminal; a first amplifier for said modulated carrier and connected to receive potential from the second terminal of the voltage source and connected to the floating ground; means coupled to said first amplifier for demodulating said modulated carrier from said first amplifier to recover the modulating signals; a second amplifier coupled to the demodulating means and responsive to differences in potential between the chassis and floating grounds and to the modulating signals for amplifying the modulating signals in accordance with such difference in potential between the chassis and floating grounds; means connecting the second terminal of the voltage source to the second amplifier for energizing the second amplifier to obtain the production of the output signals; means connected between the chassis and floating grounds and having characteristics to vary the potential at the floating ground in accordance with variations in the voltage from the source and variations in the ambient temperature of the receiver; and an automatic gain control circuit coupled between said demodulating means and said first amplifier and connected to the floating ground to vary the potential at the floating ground in accordance with the amplitudes of the received signals.

10. A radio receiver for receiving and demodulating a modulated carrier and having a chassis, including a source of direct voltage and having first and second terminals, a ground connection connected to the chassis and to the first terminal of the voltage source, a floating ground, a first amplifier for the modulated carrier and connected to said floating ground, a direct current biasing path for said first amplifier and including a diode connected to said chassis and floating grounds for providing a potential on the floating ground in accordance with the variations in the potential across the diode resulting from variations in the voltage from the source, means coupled to said first amplifier for demodulating the amplified modulated carrier from said first amplifier, an output amplifier coupled to the demodulating means for amplifying the demodulated signal from said demodulating means, means connecting said output amplifier to receive said chassis and floating grounds and to produce signals in accordance with the relative potentials of said chassis and floating grounds, and an automatic gain control circuit coupled between said demodulating means and said output amplifier and connected to the floating ground for varying the potential across said diode in accordance with the level of the modulated carrier.

11. In a radio receiver for modulated signals and having a chassis, a chassis ground connection connected to the chassis; a source of direct voltage for energizing the receiver and having a first terminal connected to said chassis ground connection and having a second terminal; a floating ground connection; an output amplifier having a first portion connected between said second terminal of said voltage source and said chassis ground connection and having a second portion connected between said chassis ground connection and said floating ground connection to control the amplification of the output amplifier in accordance with the differences in potential between the chassis ground and the floating ground; a diode connected between said chassis ground connection and said floating ground connection for producing a variable potential across the diode and at the floating ground in accordance with the variations in the potential from the source to regulate the potential applied across said output amplifier by said voltage source; said output amplifier including two current control members having first control elements connected to the chassis ground and having second control elements connected to the floating ground and said output amplifier further including means connecting said transistors in a push-pull arrangement; means for amplifying the modulated signals received at the receiver; means coupled between said amplifier means and said output amplifier for demodulating the modulated signals and for supplying the modulating components of the modulated signals to said output amplifier; and circuit means connecting said amplifier means between said second terminal of said voltage source and said floating ground connection whereby said amplifier means functions as a bleeder impedance for said diode to facilitate the regulating action of said diode.

12. In a portable radio receiver for modulated signals and having a chassis, a chassis ground connection connected to the chassis; a source of direct voltage for energizing the receiver and having a first terminal connected to said chassis ground connection and having a second terminal; a floating ground connection; an output amplifier having a first portion connected between said second terminal of said voltage source and said chassis ground connection and having a second portion connected between said chassis ground connection and said floating ground connection; a diode connected between said chassis ground connection and said floating ground connection and having characteristics for varying the potential across the diode and at the floating ground in accordance with variations in the potential from the source to regulate the potential applied across said output amplifier by said voltage source; said output amplifier including two transistors each having a pair of control elements respectively connected to receive the chassis ground and the floating ground and said output amplifier further including means connecting said transistors in a push-pull arrangement to obtain a regulated output from the amplifier stage; means for amplifying the modulated signals received at the receiver, means coupled between said amplifier means and said output amplifier for demodulating the modulated signals and for supplying the modulating components of the modulated signals to said output amplifier; circuit means connecting said amplifier means between said second terminal of said voltage source and said floating ground connection whereby said amplifier means functions as a bleeder impedance for said diode to facilitate the regulating action of said diode; and an automatic gain control circuit coupled between said demodulating means and said output amplifier for varying the relative potential provided to the control elements of the transistors in said output amplifier in accordance with the level of the modulated carrier to obtain a regulated output from the amplifier stage.

13. A radio receiver for a modulated signal, including, an amplifier for the modulated signal, a demodulator coupled to said amplifier for recovering the modulating signal from the amplified modulated signal from said amplifier, an output amplifier coupled to said demodulator for amplifying the modulating signal recovered by said demodulator, a temperature compensation circuit coupled across said output amplifier for compensating for variations in the ambient temperature of the receiver, and an automatic gain control circuit coupled to said demodulator and to said compensation circuit for obtaining variations in the current through said compensation circuit in accordance with the level of the modulating signal from said demodulator to facilitate the compensating action of said compensation circuit.

14. A radio receiver for a modulated signal and having a chassis, including, a chassis ground connected to the chassis, a floating ground, a source of direct voltage and having first and second terminals, the first terminal of the voltage source being connected to the chassis ground, means for demodulating the modulated signal, means connected to receive potential from the second terminal and responsive to the demodulated signal and responsive to the chassis and floating grounds for amplifying the demodulated signal in accordance with any differences between the potentials of the chassis and floating grounds, and compensating means connected between the chassis and floating grounds for varying the potential at the floating ground relative to the potential on the chassis ground in accordance with changes in the potential from the source and changes in the ambient temperatuer of the receiver to obtain a regulation of the potential introduced from the second terminal of the amplifier to the amplifying means.

15. The receiver set forth in claim 14 in which the demodulating means is coupled to the floating ground to facilitate the action of the compensating means in regulating the potential at the floating ground.

16. The receiver set forth in claim 14 in which the demodulating means is coupled to the floating ground to provide an impedance-bleeding action across the compensating means in facilitating the regulating action of the compensating means and in which the compensating means has an impedance variable with variations in the voltage from the source and with variations in the ambient temperature of the receiver.

References Cited in the file of this patent

UNITED STATES PATENTS

| | | |
|---|---|---|
| 1,883,613 | Devol | Oct. 18, 1932 |
| 2,364,238 | Nicholson | Dec. 5, 1944 |
| 2,399,968 | Whitelock | May 7, 1946 |
| 2,704,330 | Marker | Mar. 13, 1955 |
| 2,833,870 | Wilhelmsen | May 6, 1958 |
| 2,897,353 | Schweiss | July 28, 1959 |

OTHER REFERENCES

Landefeld: "A Transistorized Communications Receiver," CQ May 1959, pages 32–37 and 139–141.